Dec. 25, 1923.   H. C. SMITH   1,478,620
TRAP NEST
Filed May 3, 1923
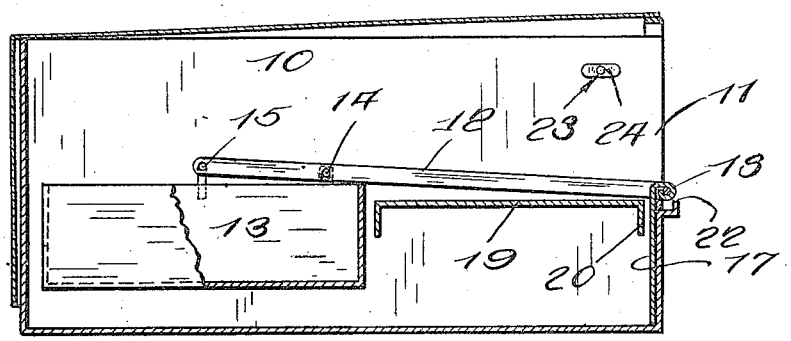
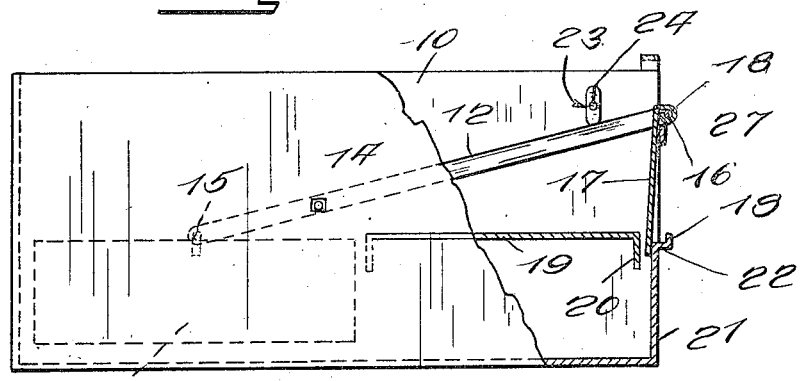
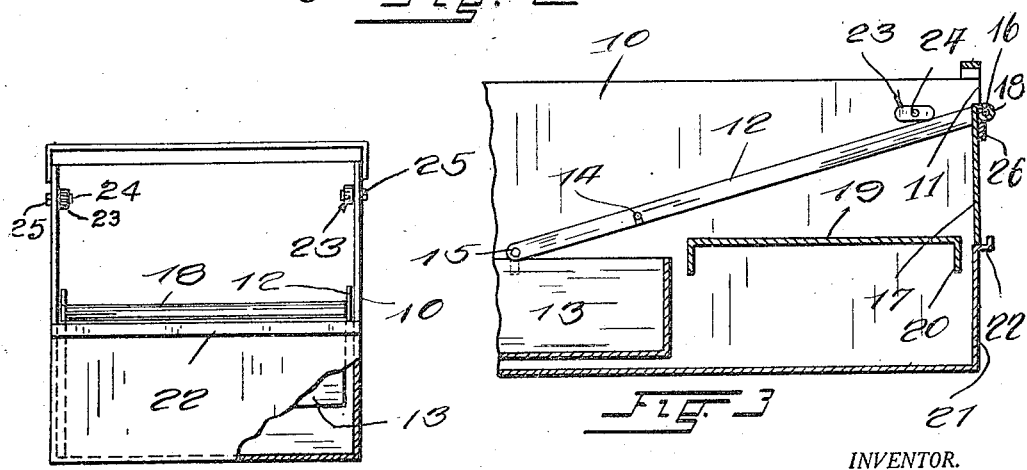
INVENTOR.
H.C. SMITH
Watson E. Coleman
ATTORNEY.

Patented Dec. 25, 1923.

1,478,620

UNITED STATES PATENT OFFICE.

HENRY C. SMITH, OF DENVER, COLORADO.

TRAP NEST.

Application filed May 3, 1923. Serial No. 636,503.

*To all whom it may concern:*

Be it known that I, HENRY C. SMITH, a citizen of the United States, residing at Denver, in the county of Denver and State of Colorado, have invented certain new and useful Improvements in Trap Nests, of which the following is a specification, reference being had to the accompanying drawings.

This invention relates to trap nests, and the general object of the invention is to provide a trap nest having a trap door controlling the opening through which the hen enters or leaves the nest, and provide manually operable means to cause the latching of the trap door when the hen enters the trap and gets upon the nest so as to prevent the hen from leaving the nest until desired, the manually operable means, however, being capable of being so shifted as to permit the trap door to shift to its unobstructing position when the hen leaves the nest.

A further object is to provide means whereby a laying hen may be kept upon a nest at the discretion of the owner and other hens kept out of the nest at this time.

Other objects will appear in the course of the following description.

My invention is illustrated in the accompanying drawings, wherein :—

Figure 1 is a longitudinal sectional view of a trap nest constructed in accordance with my invention and showing the trap door down and the nest proper raised;

Figure 2 is a side elevation of the construction shown in Figure 1 partly broken away, showing the trap door raised and the nest lowered under the weight of a hen, the trap door, however, being unlatched so as to permit the hen to leave the nest whenever she so desires;

Figure 3 is a fragmentary longitudinal sectional view of the forward end of the nest, showing the trap door raised and latched;

Figure 4 is an end elevation partly in section of the front of the nest box.

Referring to these drawings, 10 designates a covered nest box of any suitable character and dimensions. This nest box is provided with the entrance opening 11 whereby the hen may enter or leave the nest box. Mounted within the nest box and fulcrumed upon members projecting from the side walls of the nest box are a pair of levers 12, the rear ends of which are pivotally connected to a depending nest box 13. The levers are shown as being notched and operating upon bolts or pins 14 extending in through the side wall of the box so that the levers may be lifted up with the nest 13 and removed whenever desired.

The nest 13 is connected to the levers by means of trunnions 15 or hangers which extend upward from the nest 13 and then inward and are engaged with the rear ends of the levers. The forward ends of the levers 12 are connected by a transverse rod 16 and swingingly mounted upon this rod is a door 17 which depends therefrom, this door being provided with a bead 18 at its upper end through which the rod 16 passes. This door is preferably made of metal or other light material. Disposed inward of the entrance 11 is a platform 19 and the forward end of this platform is flanged, as at 20, and spaced from the forward wall 21 of the nest box. This forward wall 21 extends upward from the bottom of the box to a point slightly below the platform 19 and then is outwardly and then upwardly flanged, as at 22, to form a transversely extending seat. Under ordinary circumstances the door 17 is disposed to rest against the inside face of the wall 21 and to move up and down between this wall 21 and the flange 20, but when the nest 13 is fully depressed and the door is fully raised, the door will swing outward to the position shown in Figure 3 and rest upon this seat.

I have provided means for limiting the upward movement of the levers 12 to the point shown in Figure 2 or permitting the upward movement of the levers to the point shown in Figure 3, and to this end I mount upon the side walls of the nest box the buttons 23. These buttons are mounted each upon a small shaft 24 which is mounted upon the wall of the nest box and is provided with a handle 25 on its outer end. The buttons are elongated in one direction and thus it will be obvious that when the buttons are turned to a horizontal position, as shown in Figures 1 and 3, the levers 12 may move up to such a position that the door will swing outward and rest upon the seat 22. When, however, the buttons are turned to the position shown in Figure 2, they will permit the levers to raise, so that the gate may be nearly fully raised but cannot swing into position upon the seat 22. When the gate is swung into the position shown in Figure 3, it is obvious that the hen may not leave the nest, and further that nothing may enter the nest for the reason that the platform 19 is slightly above the seat 22 and if the swinging gate 17 is pushed backward by an animal attempting to enter the trap nest, it will catch against the flange 20, which will prevent the inward movement of the gate. Where the parts are in the position shown in Figure 2, however, while nothing may enter the trap nest because of the fact that the gate if pushed back will strike the flange 20, yet when the hen rises from her nest the nest will rise and the door 17 will fall so as to permit the hen to pass out of the nest. A counterweight 26 is provided which is attached to the gate or connected in some way to the forward ends of the levers so as to counterbalance the nest.

Under normal circumstances, this counterweight will cause the nest 13 to be lifted and the door 17 to be depressed. When a hen enters the nest 13, the nest will be depressed under her weight and the door will be raised to the position shown in either Figures 2 or 3, depending upon whether the button 25 is turned into a horizontal position or to a vertical position. If in a vertical position the hen as soon as she wishes can leave the nest. If, however, the button is turned to a horizontal position the door will latch, as illustrated in Figure 3, and the hen can only leave the nest when her owner pleases.

It will be seen that the levers 12 are slotted for the reception of the bolts 14 so as to permit the nest to be removed in its entirety from the box 10. Obviously, to clean the nest all that is necessary is to remove the levers from the fulcrum bolts 14 and take the nest out of the box. The trap door 17 is also removable from the levers by spreading the levers 12 apart and thus disengaging the ends of the hinge pin 16. It will be obvious that this trap nest may be made of any suitable material and may be placed either in tiers or rows if desired and any suitable arrangement of the trap nests may be made.

While I have illustrated a particularly effective detailed construction, I do not wish to be limited thereto as it is obvious that this detailed construction might be varied in many ways without departing from the spirit of the invention as defined in the appended claims.

It will be seen that with this construction means is provided whereby a laying hen may be kept upon a nest at the discretion of the owner for the purpose of keeping track of just how many eggs this particular hen may lay. The weight of the trap door with the weight of the counterpoise is just sufficient to balance a setting of eggs and does not prevent the hen from entering or leaving. The nest is only trapped, therefore, when the owner wants to keep track of how a certain hen may lay.

I claim:—

1. A trap nest comprising a nest box open at one end, a pair of levers operatively pivoted on the box, a nest pivotally mounted upon the inner ends of the levers, means counterweighting the nest box and mounted upon the outer ends of the levers, a vertically movable door carried by the outer ends of the levers and coacting with the open end of the box and closing the open end of the box when the nest is depressed under the weight of a hen, a shoulder over which the lower edge of the door swings when the door is fully raised, and manually operable means shiftable to permit the levers to raise to their full extent or prevent the levers rising to their full extent and the swinging of the door over said shoulder.

2. A trap nest comprising a nest box, the forward end of the nest box having an upwardly extending wall, the upper edge of the wall being outwardly and then upwardly flanged to form a seat, levers pivoted operatively upon the nest box, a nest swingingly mounted upon the rear ends of the levers, a platform disposed between said nest and said seat and disposed on a level slightly higher than the seat, a door pivoted upon the forward ends of the levers for swinging movement, said door when the levers are fully raised being adapted to swing forward into engagement with and over said seat, and a manually operable stop mounted upon the wall of the box and adapted in one position to prevent the forward ends of the levers from rising to their full height and the door swinging over said seat and when turned in another position permitting the extreme upward movement of the levers and the door to swing over said seat.

3. A trap nest comprising a nest box, the forward end of the nest box having an upwardly extending wall less in height than the height of the box, said wall terminating in an outwardly and upwardly extending flange constituting a seat, levers operatively pivoted upon the box, a nest proper swingingly mounted upon the rear ends of the levers, the forward ends of the levers being weighted to counterpoise the nest box, a platform supported within the box and extending between the nest and said seat, the platform being disposed at a height slightly above the seat, a door swingingly carried by said levers and having its pivotal axis in advance of the forward ends of the levers whereby the lower edge of the door will tend to swing outward when the levers are raised to their highest position to thereby cause the lower edge of the door to be disposed over said seat, and manually operable stops mounted upon the side walls of the box and shiftable in one position to limit the upward movement of the levers to a position where the lower edge of the door is disposed below the said seat and in another position permitting the levers to rise to a point where the lower edge of the door is above said seat to thereby permit the door to swing over said seat.

In testimony whereof I hereunto affix my signature.

HENRY C. SMITH.